Oct. 22, 1935.  P. G. WAGNER  2,018,389
FRUIT JUICE CONTAINER AND MIXER
Filed May 8, 1933   3 Sheets-Sheet 1
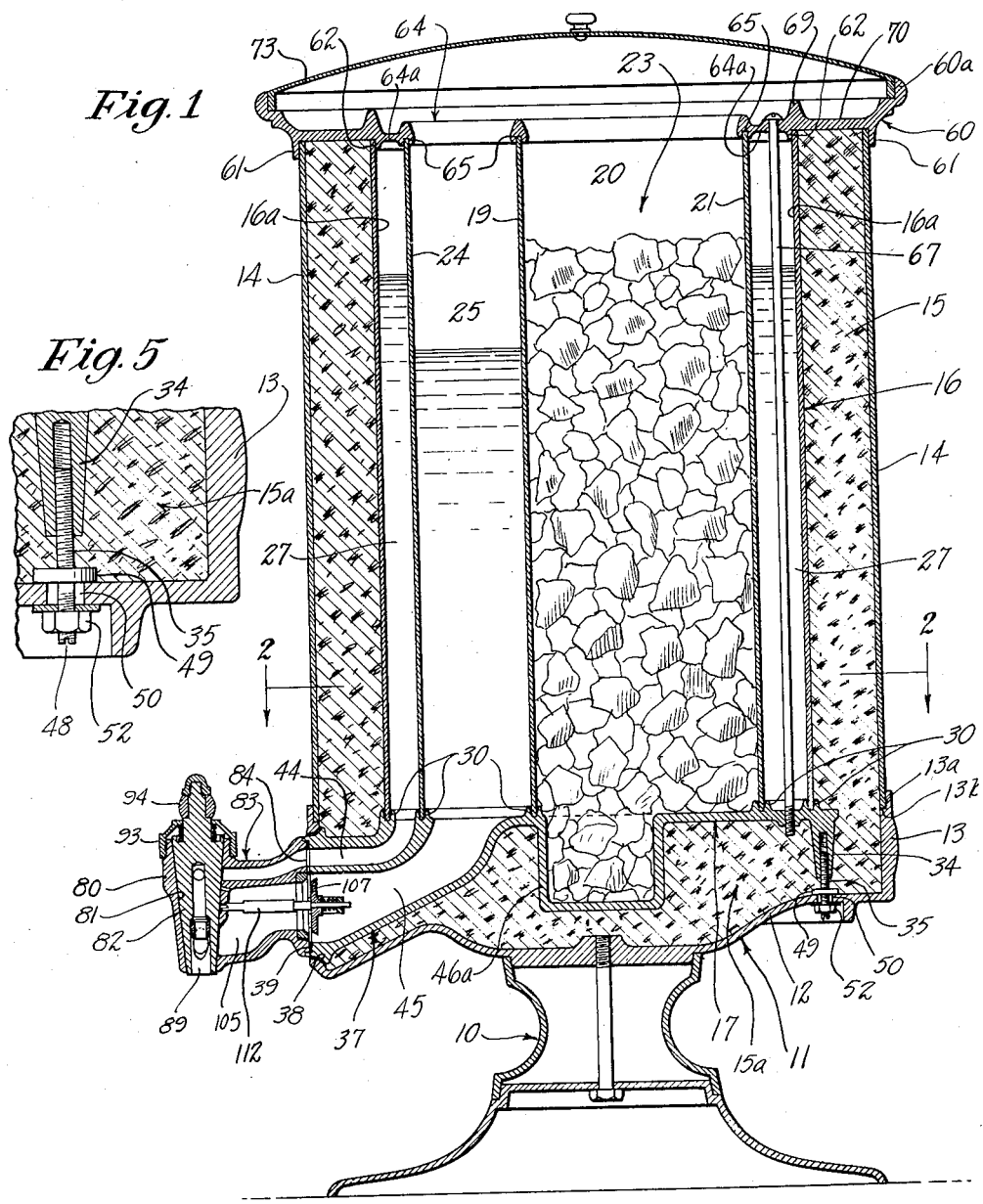
Fig. 1
Fig. 5
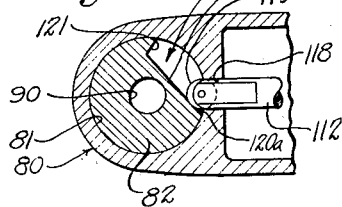
Fig. 10a
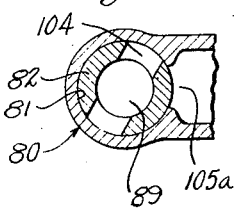
Fig. 11a
Inventor
Paul G. Wagner.
Attorney.

Oct. 22, 1935.    P. G. WAGNER    2,018,389
FRUIT JUICE CONTAINER AND MIXER
Filed May 8, 1933    3 Sheets-Sheet 2
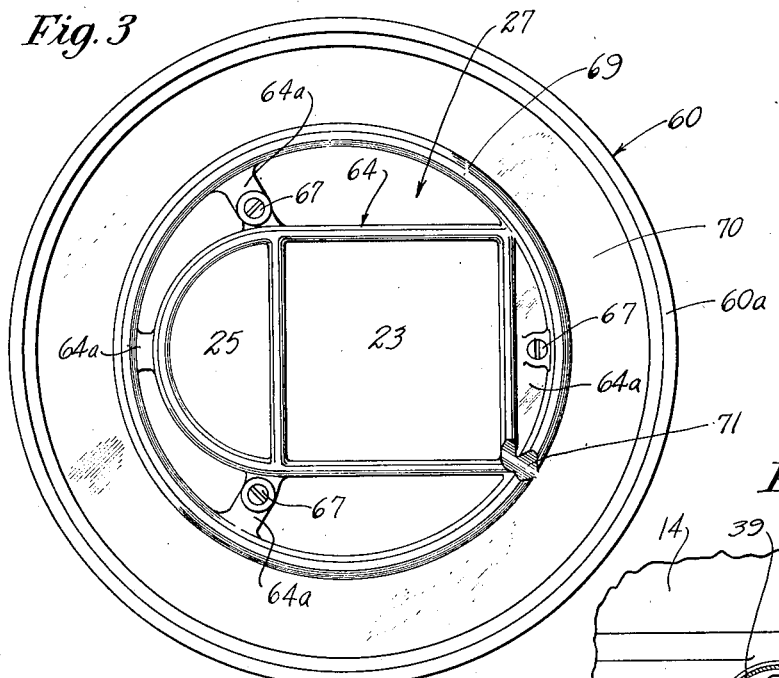
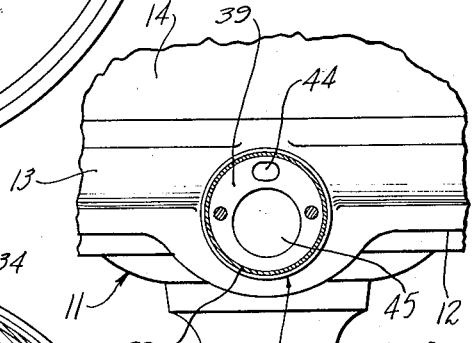
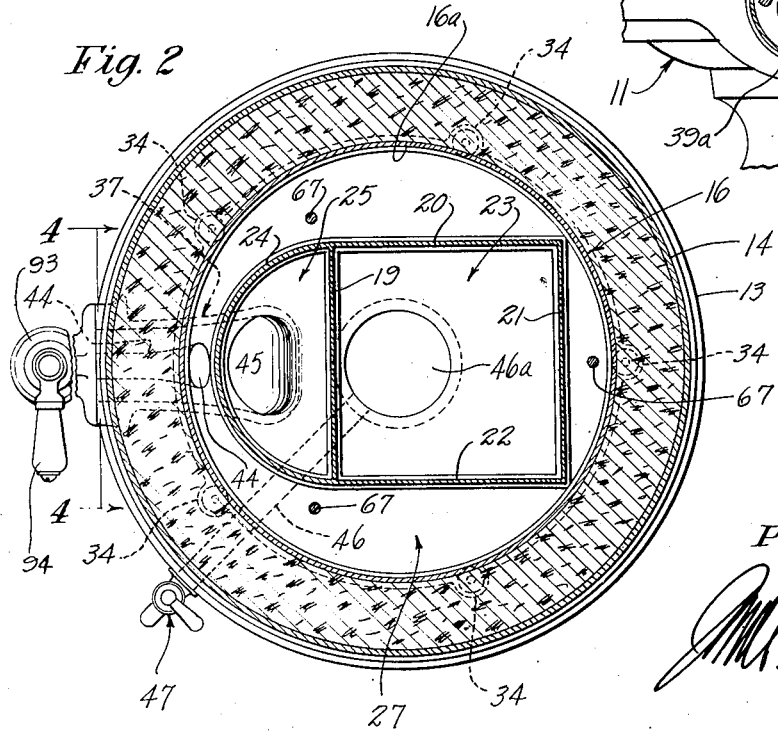
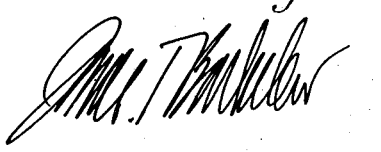

Oct. 22, 1935.   P. G. WAGNER   2,018,389
FRUIT JUICE CONTAINER AND MIXER
Filed May 8, 1933   3 Sheets-Sheet 3
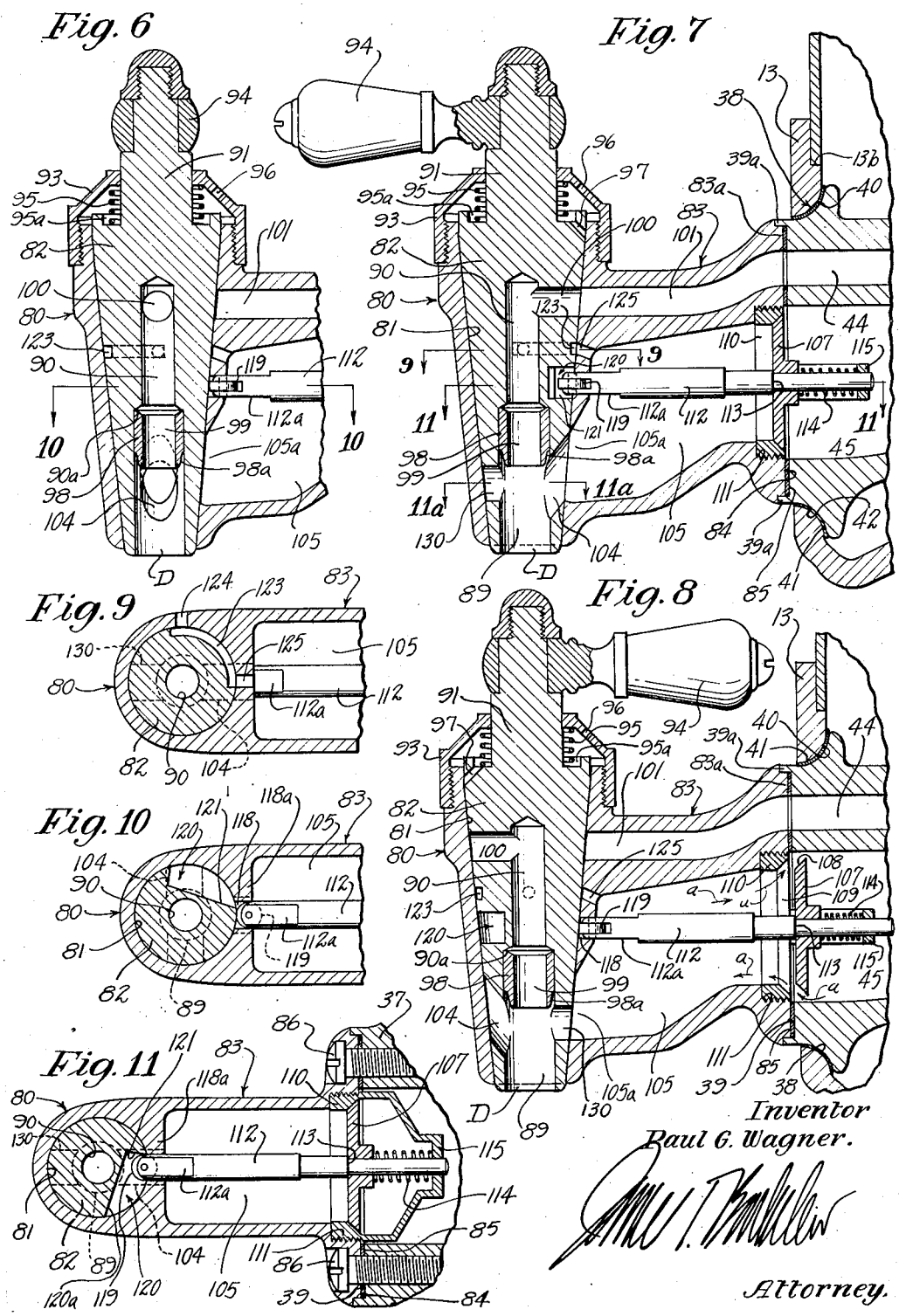
Inventor
Paul G. Wagner.
Attorney.

Patented Oct. 22, 1935

2,018,389

UNITED STATES PATENT OFFICE 2,018,389

FRUIT JUICE CONTAINER AND MIXER

Paul G. Wagner, Los Angeles, Calif.

Application May 8, 1933, Serial No. 669,929

19 Claims. (Cl. 225—26)

This invention relates generally to containers and mixers for drinks, and particularly for drinks such as mixtures of concentrated citrus fruit juice or syrup and water which should not be combined until the time of dispensing because of various reasons such as a tendency to spoilage. The invention to be described is adapted to storing and mixing of liquids of any character, although it has been particularly designed with the problems in view incident to storing and mixing concentrated citrus fruit juice and water drinks, and will accordingly be herein described principally in that connection, but without limitation thereto.

While it is preferable from the dispensing standpoint to make up batches of pre-mixed fruit juice concentrates and water, it is well known that the juice concentrate should be stored separately from, rather than kept ready mixed with, water because of the tendency of such a mixture to spoil after standing but a very short time. To avoid such spoilage, it has therefore been customary to draw for each individual customer an amount of juice from one container and then to dilute that juice with water drawn from a separate container. This practice is disadvantageous in that two separate units are required, each with its individually controlled valve, two operations are required to complete the mixture, the mixtures are variable, and the act of dilution, occurring within view of the customer, somewhat lessens the attractiveness of the drink, in spite of the fact that such dilution is necessary to a palatable mixture.

It is accordingly an object of the present invention to provide a cooling container adapted to store separately the two liquids of which the drink is to be composed, but in which a single cooling unit serves to chill both liquids, and a mixing valve in combination with the container to mix said liquids as they are discharged from their separate storage compartments, so that the drink is dispensed from the container ready mixed.

It is a further object of the invention to provide a dispensing means which will dispense a predetermined measured quantity of one of the two liquids, for instance of the fruit juice, so, for each operation of the dispensing valve, the amount of clear juice delivered to a glass of given capacity will be proper to give desired strength to an amount of mixture necessary to fill the glass.

It is a characteristic feature of the dispensing means of the present invention that each operation of the faucet handle to "on" position causes discharge of a predetermined, measured quantity of one of the two liquids; while the same operation of the faucet handle to "on" position, in the present embodiment of the invention, also causes simultaneous discharge of the second liquid, but the quantity of the second liquid discharged is not measured in amount but depends upon the length of time the handle is held in "on" position and therefore depends on the size of the glass to be filled.

A further object of the invention is to provide for efficient cooling of the two separately stored liquids, and to insulate the cooling tank effectively against heat and provide a construction in which conduction of heat to its interior is reduced to a minimum.

There are numerous other objects and corresponding features of the invention pertaining to features of advantageous relative arrangement and construction, both of the containers and of the dispensing and mixing means, as well as additional features involving functions incidental to those primarily mentioned, as will appear in the course of the specification.

The invention will now best be understood without further preliminary discussion by referring immediately to the following detailed description of a present preferred embodiment thereof, reference for this purpose being had to the accompanying drawings, in which:

Fig. 1 is a vertical medial section through the container and valve mechanism;

Fig. 2 is a horizontal section taken on line 2—2 of Fig. 1;

Fig. 3 is a top plane view of the container, the cover being removed;

Fig. 4 is a section taken on line 4—4 of Fig. 2;

Fig. 5 is an enlarged detail taken from Fig. 1;

Fig. 6 is an enlarged detail of the valve mechanism in the position illustrated in Fig. 1, Figs. 1 and 6 showing the faucet valve in "closed" position;

Fig. 7 is a section through the faucet and valve mechanism showing the parts in "on" position;

Fig. 8 is a view similar to Fig. 7 but showing the parts with one liquid port in closed position and the other liquid port in open position.

Fig. 9 is a section taken on line 9—9 of Fig. 7;

Fig. 10 is a section taken on line 10—10 of Fig. 6;

Fig. 10a is a section similar to that of Fig. 10 but showing a different position of the ports;

Fig. 11 is a section taken on line 11—11 of Fig. 7; and

Fig. 11a is a section taken on line 11a—11a of Fig. 7, the valve plug, however, being in the position indicated in Fig. 10a.

For descriptive purposes, I will refer to certain liquids as being contained within and dispensed from the several compartments of the container, but it will be understood this choice is for convenience only and is not in any way to be considered as limitative on the invention.

In the preferred embodiment of my invention illustrated in the drawings numeral 10 designates a base pedestal of any suitable form, on which is mounted base casting 11 having closed bottom 12 and upwardly extending flange or side wall portion 13 which is countersunk at 13a to provide an upwardly facing annular shoulder 13b. The lower end of shell or exterior casing 14 is taken snugly within the countersink, with the end of the casing engaging shoulder 13b. Annularly spaced within casing 14, so as to leave an annular space 15 for heat insulation material, is liquid tank unit 16, having an outer cylindrical wall 16a and a bottom casting 17, which latter may be of any suitable material adapted to resist corrosion by the liquids which come into contact with it; for instance, Government bronze, preferably heavily hot-tin dipped, is well suited to the purpose and is preferred. Container unit 16 is interiorly divided to provide juice, water and ice compartments with common bottom 17. In the preferred embodiment illustrated, vertical walls 19, 20 and 21 define an interior ice container or compartment 23 of substantially square horizontal section; arcuate wall 24 forms in cooperation with wall 19 a juice container or compartment 25 which is half-round in horizontal section; while the space between wall 16a and the outer walls of compartments 23, 25 provides a surrounding water compartment 27. These several compartment walls are taken at their lower edges within channels 30 formed in the upper face of bottom casting 17, the channels first being filled with molten tin, and the walls then being set into them and the tin allowed to chill. The union so formed is permanent and dependable, and the tinning also minimizes electrolytic action between the bottom casting and the container walls, which latter are preferably of stainless steel.

While the proportionate sizes of the compartments may vary within wide limits, I may state that it has been found practicable to employ a juice compartment of one half gallon capacity, a water compartment of two gallons capacity, and an ice compartment having a capacity of twelve pounds of ice.

Container bottom casting 17 has a plurality of downwardly extending legs 34, here shown as five in number (see Fig. 2), which are tapped to receive screw threaded mounting studs 35 which support casting 17 spacedly above and from the bottom of base casting 11 (see Figs. 1 and 5). Insulating material 15a fills the space thus formed.

Projecting outwardly and downwardly from casting 17 is a conduit, generally designated by numeral 37, provided with passageways leading from liquid compartments 25 and 27, the end of the conduit being adapted to extend through an opening 38 in base casting wall 13 and having its outer vertical face 39 lying in a plan preferably just outside the outer surface of said wall portion 13 (see Fig. 7). Projecting marginally from face 39 is an annular flange 39a, the purpose of which will appear later. The opening 38 has tapered, preferably convex, seat 40, and the nose of conduit 37 has a complementary conformation 42, an insulating washer 41, preferably of rubber, being interposed between 40 and 42.

Conduit 37 is formed with an upper liquid passageway 44 that communicates with the outer liquid or water compartment 27, and an inner and lower passageway 45, of larger cross section than passageway 44 (see Fig. 4), that communicates with the inner, second liquid or juice compartment 25. The relatively large size of conduit 45 is to induce relatively free circulation of the relatively thick liquid that is to flow therethrough. A drain pipe 46 leads from the well 46a provided in casting 17 beneath ice compartment 23, said pipe extending through base casting 11, and having a spigot 47 on its outer end (see Fig. 2).

As shown in Figs. 1 and 5, studs 35 on which the tank bottom casting 17 is mounted are headless, having screw driver slots 48 in their lower ends. These studs are each furnished with an intermediate integral collar 49, and before container bottom casting 17 is mounted in base casting 11 the studs are screwed into legs 34 until collars 49 engage the lower ends thereof. This raises the lower ends of the studs sufficiently that casting 11 can be manipulated to project conduit 37 through opening 38 into the position of Fig. 8, the lower ends of studs 35 projecting, with clearance, through openings 50 in base casting 12, collars 49 then engaging the upper surface of said casting. Tank bottom casting 17 is then leveled and brought to proper height (Fig. 1) by proper selective rotation of said studs with a screw driver, the stud collars of course remaining in engagement with base casting bottom 12 to carry the weight. With casting 17 properly positioned, lock nuts 52 are screwed on the lower ends of the studs and set up against casting bottom 12, the adjustment thus being preserved and castings 17 and 11 held against relative vertical movement. Attention may here be drawn to the fact that the only metallic heat-conducting connection between base casting 11 and bottom casting 17 is through studs 35, the nose of conduit projection 37 being rubber insulated at 41 from base casting 11.

Tank bottom 17 being thus properly mounted in base casting 11, the tank walls are substantially of the same height as the walls of outer shell 14. The space 15a between tank bottom 17 and base 11 and the annular space 15 between liquid tank wall 16a and outer shell 14 being first filled with some suitable heat insulation material, which may preferably be ground cork, a top ring or plate 60 is mounted on the upper edges of the interior tank and outer shell walls. Said plate has an outer annular depending flange 61 adapted to fit over the upper end of cylindrical shell 14, and a smaller diameter depending annular flange 62 adapted to fit within the upper end of cylindric tank wall 16a. The plate 60 closes off the space 16 between said walls 16a and outer shell wall 14, but is open over the several compartments 23, 25 and 27, and is provided with an open frame work 64, held spaced from wall 16 by webs 64a, having groove 65 adapted to take and brace the upper edges of the inner compartment walls. Plate 60 is held down by a plurality of through bolts 67 which pass through webs 64a and downwardly through outside liquid compartment 27 to screw thread into container bottom casting 17. An upstanding annular flange 69 on plate 60 defines the cylindrical outside liquid compartment 27, and serves as a baffle to prevent any liquid caught by the dished plate surface 70 outside said flange from draining into liquid compartments 27 and 25. However, a channel 71 (see Fig. 3) is preferably cut through flange 69 and through an adjacent portion of framework 64 to drain any liquid thus caught by plate surface 70 into the ice container 23. Plate 60 has a marginal flange 60a to confine a removable cover 73 whereby the top of the entire container is closed off.

As previously mentioned, the square inner chamber 23 is the cooling chamber and is filled with pieces of ice, and, when a juice and water drink is to be dispensed, the adjacent compartment 25 is filled with juice and the surrounding compartment 27 with water.

It will be seen that since the water chamber 27 (containing cooled water) surrounds wall 24, while wall 19 is common to the ice and juice compartment is, except for its bottom, entirely surrounded by cooling medium, an obvious advantage.

A faucet and valve means is then provided for mixing the juice and water at the time of dispensing, and the preferred illustrative valve means is characterized in that a measured predetermined quantity of the first liquid (juice, in this instance) is dispensed for each movement of the faucet handle to "on" position, while the other liquid, (water, in this instance) discharges in a continuous stream, and the quantity thereof mixed with that measured quantity of the first liquid therefore depends upon the length of time the faucet handle is held in "on" position, a glass of such size being chosen that when it is filled and the faucet therefor closed, just the right amount of water will have been added to the straight juice to give a palatable mixture.

The faucet comprises a body 80 having a vertical, tapered bore 81 for a complementarily tapered valve plug 82. Body 80 has a laterally extending portion 83 having its end 83a taken within flange 39a and presenting a flat vertical face 84 adapted to oppose the flat face 39 of conduit 37 of the liquid containers, a washer 85 of heat insulation material, as rubber, preferably being placed between said faces, a pair of screws 86 detachably fasten the faucet body against said conduit 37, as will be seen in Fig. 11.

Valve plug 82 has a reduced stem 91 extending upwardly through a cap 93 screw threaded onto the faucet body around valve plug bore 81, and said stem 91 has mounted on its upper end an operating handle 94. A compression spring 95 confined below cap 93 bears downwardly on the valve plug (the lower end of said spring being seated in an annular groove 95a in the top of the plug) and maintains it in proper seating relation in its bore. Oil may be supplied to groove 95a through oil hole 96, whence it feeds through passageway 97 to the bearing surfaces of the plug and body. Body bore 81 is open at both its upper and lower ends, and plug 82 has a central bore 90 closed at its upper end and opening at its lower end to counter bore 89. Force-fitted in counter bore 89 and with its upper end engaging shoulder 90a formed at the junction of bores 89, 90, is a bushing 98 having a bore 99 of the same diameter as bore 90, the lower end of the bushing tapering inwardly and downwardly as at 98a to clear the side walls of counterbore 89 and forming a nozzle to confine liquid discharging from bore 90 into counter bore 89 to a smooth stream or jet annularly spaced from the wall of bore 89.

Communicating with the upper end of bore 90 is a lateral port 100 which extends through the side of the plug and, by virtue of plug rotation is adapted to be brought into and out of register with liquid passageway 101 in body portion 83 that communicates directly with the liquid passage 44 in conduit 37. Thus operation of faucet handle 94 to move the valve plug into position with port 100 in communication with passageway 101 permits the water in container 27 to flow downwardly through passageways 44 to 101 and thence through the liquid passageway 100, 90 and 89 in the valve plug to discharge in a steady stream from the faucet. In the embodiment illustrated, this occurs when handle 94 extends straight forwardly, as in Fig. 7. On the other hand, "off" position for the handle is indicated in Fig. 2, valve plug 82 then being in the position of Fig. 6 so the mouth of passage 101 is blanked by the plug body.

Plug 82 has also a port 104 which opens at one end into bore 89 at a point just below nozzle 98 and thence angles upwardly through the side of the plug. Port 104 is located to register with a trap or charge measuring chamber 105 of predetermined liquid capacity and formed in body portion 83, only when port 100 registers with passageway 101. Trap chamber 105 communicates with liquid passageway 45 in conduit 37, and thus, at times, with the inner liquid or juice compartment 25. Communication between passageway 45 and trap chamber 105, however, is controlled by a valve 107, and this valve is held open to permit trap chamber 105 to fill from compartment 25 when the faucet is in "off" position (Figs. 1, 6 and 10) by means controlled by the faucet valve plug, and is automatically closed when the faucet is in "on" position (Figs. 7 and 11) so that the amount of liquid from juice compartment 25 discharged through the faucet for each actuation thereof is limited to the capacity of trap chamber 105, all as will now be described in more detail.

Valve disk 107 has a conical seating surface 108 adapted to seat on the conical surface 109 of seating ring 110 which is threaded into counterbore 111 sunk in faucet body face 84 around trap chamber 105. Valve disk 107 is mounted on a horizontal axial push-rod or valve stem 112, the latter having sliding bearing at one end in bridge 115, formed integrally with seat ring 110, the other end of the rod being flattened at 112a and having sliding and non-rotative fit through complementary aperture 118 extending through wall 118a which separates bore 81 from trap chamber 105. A horizontally arranged roller 119 is carried at the forked and flattened end 112a of the stem, said roller being adapted to engage plug 82 in a manner to be described.

Compression spring 114 encircles stem 112 between disk 107 and bridge 115, tending always to move the disk to the closed position of Figs. 7 and 11, and, since disk 107 bears against annular shoulder 113 on stem 112, also tending to shift stem 112 to the left in Figs. 6, 8 and 10.

When plug 82 is in the "off" position of Figs. 1, 6 and 10, roller 119 bears on the periphery of the plug, and the length of stem 112 is such that valve disk 107 is at that time held clear of seat 109 and the juice from compartment 25 is free to flow through passage 45 into trap chamber 105, plug 82 closing the outlet orifice 105a, so said chamber fills, thus containing a charge of juice in predetermined, measured amount. The air displaced from the trap by the entry of the juice, bubbles up through the juice in compartment 25, thus serving to agitate that liquid and keep the pulp or other relatively heavy ingredient from settling.

As handle 94 is turned to rotate plug 82 in a clockwise direction from the position of Fig. 10, to the position of Fig. 10a, cam slot 120 cut in plug 82 comes into full register with opening 118, allowing stem 112 to be moved to the left under the influence of spring 114 as applied to valve 107. During this movement, which shifts valve 107 to the closed position of Fig. 7, roller 119 rides down cam surface 120a, which may be described as substantial chordal.

The various faucet elements are so proportioned and arranged that valve 107 is fully closed before plug port 104 has come into register with trap orifice 105a (see Fig. 11a in which the plug is in the same position as Fig. 10a) and, accordingly, when a continued rotation of the plug brings said port and orifice into register to empty the trap chamber, there can be no flow of juice from passage 45 into said trap chamber and hence only the predetermined amount of juice can be delivered.

During such continued rotation, cam surface 120a leaves roller 119 (it thus being assured spring 114 may be fully effective to close valve 107 tightly). However, the substantially radial shoulder 121 of slot 120 engages the roller 119 or the side of stem 112, as indicated in Fig. 11, to limit the extent of plug rotation, thus establishing the "on" position of the plug (Fig. 7), at which time ports 100 and 104 are in registration with passage 101 and orifice 105, respectively.

Body 80 and wall 118a have airports 124 and 125, respectively, said ports being in the same horizontal plane but spaced about 90° apart. Plug 82 has a peripheral groove 123 which brings ports 124 and 125 into communication when the plug is rotated to "on" position, as described above, the peripheral face of the plug barring such communication at all other times.

With the plug thus turned to "on" position (Figs. 6, 7, 9 and 11) it will be seen that juice from trap chamber 105 and water from passageway 101 and hence from water compartment 27 are free to flow simultaneously through the valve plug and out delivery orifice D, the ports 124—125 and groove 123 putting the top of trap chamber 105 into communication with the atmosphere to facilitate the emptying of the trap chamber.

The emptying of the trap chamber is further promoted by the jet action of the water discharging through nozzle 98a past orifice 104. It will be obvious that the quantity of juice discharged from the trap chamber 105 depends upon the volume of said trap chamber, whereas the quantity of water which will be discharged through passageway 101 depends upon the length of time the faucet is held in "on" position, since the latter liquid flows in a steady stream. When sufficient water has thus been drawn, the faucet handle is turned a quarter of a turn back to the right, valve plug ports 100 and 104 first being moved out of registration with passageway 101 and trap chamber 105, respectively, (Fig. 11a) and the cam surface 120a on the valve plug then engaging roller 119 (Fig. 10a) to move push-rod 112 to the right and back to its position of Figs. 1, 6 and 10, in which position valve 107 is again unseated and juice from container 25 and passageway 45 again fills trap chamber 105. Port 125 is blanked by plug 82 during the initial return movement of the plug, it following that there may be no escape of air or juice through the air passage.

Thus it is characteristic of the specifically described embodiment of my invention that a measured quantity of juice is discharged for each operation of the faucet handle, and a steady stream of water is simultaneously discharged to mix with that fixed quantity of juice. The capacity of the trap chamber is determined by the quantity of juice proper for the size of glass to be used for the drink. In ordinary use, a glass is placed under the faucet and the handle turned to "on" position. The syrup in the trap chamber is discharged along with the water and by the time the glass is filled with water the juice is emptied from the trap chamber, and the faucet handle is turned back to "off" position.

As a means for drawing juice without mixing it with water, for instance when it is desired to drain liquid compartment 25, I provide valve plug 82 with a port 130 substantially diametrically opposite to the previously described port 104, said port 130 registering with trap chamber 105 when the valve plug is in the position of Fig. 8, with faucet handle 94 straight back, as shown. In that position roller 119 of push-rod 112 remains in engagement with the periphery of the plug and the push-rod accordingly continues to hold valve 107 unseated. However, liquid passageway 101 is closed off since valve plug port 100 is then 180 degrees out of registration therewith, while air port 125 remains blanked off by the plug, all as clearly shown in Fig. 8. Liquid from container 25 then flows continuously past valve 107 and through port 130 to discharge from the faucet in a continuous stream.

With the juice thus drained from compartment 25 handle 94 may be swung to the position of Fig. 7, whereupon the water drains from compartment 27.

A feature of considerable advantage in the device resides in the fact that the liquid in the trap chamber is near or below the body of liquid in compartment 25, so, as it tends to warm in the trap chamber it rises back into compartment 25 and is replaced by freshly cooled liquid, as indicated by arrows a. The considerable vertical extent of the orifice of valve ring 110 (open at all times except when the faucet is "on") facilitates this circulation. The temperature of the first drink drawn, after the container has stood for some time without drawing a drink, is therefore practically as cool as the coolest liquid within the container. By reason of the heat insulation provisions the efficiency of cooling of the entire device is very high, heat conduction to the liquid tanks by way of metal to metal parts being reduced to a minimum.

It will be understood the drawings and description are to be considered merely as illustrative of and not restrictive on the broader claims appended hereto, for various changes in design, structure and arrangement may be made without departing from the spirit and scope of said claims.

I claim:

1. In a device of the character described, a trap chamber of given capacity adapted to fill with liquid, a reciprocable valve controlling liquid flow into said trap chamber, a faucet embodying a body and a rotatable valve which communicates directly with said trap chamber, said rotatable valve adapted to open and close flow from said chamber through said faucet, and on operative interconnnection between the rotatable faucet valve and the reciprocable trap chamber valve such that said trap chamber valve is closed as said faucet valve is opened.

2. In a device of the character described, a trap chamber of given capacity adapted to fill with liquid, a valve controlling liquid flow into said trap chamber, and a faucet embodying a body and a rotatable ported valve plug which communicates directly with said trap chamber, said rotatable ported valve plug controlling liquid flow from said trap chamber through said faucet body and means operated by rotation of said valve plug toward open position to close the trap chamber valve.

3. In a device of the character described, a trap chamber of given capacity adapted to fill with liquid, a valve controlling liquid flow into said trap chamber, and a faucet embodying a body and a rotatable ported valve plug which communicates directly with said trap chamber, said rotatable ported valve plug controlling liquid flow from said trap chamber through said faucet body, said valve plug having a cam surface, and means controllable by said cam surface as the plug is rotated toward open position to close the trap chamber valve, and as the plug is subsequently rotated toward closed position to open the trap chamber valve.

4. In a device of the character described, a trap chamber of given capacity adapted to fill with liquid, a valve controlling liquid flow into said trap chamber, a spring acting constantly to close said valve, a faucet embodying a body and a rotatable ported valve plug which communicates directly with said trap chamber, said rotatable ported valve plug controlling liquid flow from said trap chamber through said faucet body, and means controlled by the valve plug normally holding the trap chamber valve open against said spring, said means being releasable to permit closure of the trap chamber valve by virtue of rotation of the valve plug toward open position.

5. In a device of the character described, a trap chamber of given capacity adapted to fill with liquid, a valve controlling liquid flow into said trap chamber, a spring acting constantly to close said valve, a faucet embodying a body and a rotatable ported valve plug which communicates directly with said trap chamber, said rotatable ported valve plug controlling liquid flow from said trap chamber through said faucet body, operating means for opening the trap chamber valve against its spring, and a cam surface on said valve plug controlling said operating means to permit the trap chamber valve to be closed by its spring as the valve plug is rotated to open position and to open said valve as the valve plug is rotated to closed position.

6. Liquid dispensing means for a liquid container which has separate compartments for separate storage of two liquids, comprising a discharge faucet for both of said compartments, said faucet embodying a body having a liquid passage connected with one of the compartments and a trap chamber of a given capacity connected with the other of the compartments, a valve controlling liquid flow into said trap chamber, said faucet embodying a rotatable ported valve plug having a longitudinal discharge passageway and ports communicating therewith adapted to register simultaneously with said trap chamber and said liquid passage respectively, valve operating means controlled by rotation of the valve plug for closing said trap chamber valve as the valve plug is moved toward position of registration of said valve plug ports with said liquid passageway and chamber, and for opening said trap chamber valve as the valve plug is rotated from said position of registration, and another port in said valve plug adapted to register with said trap chamber at a position of the valve plug wherein the trap chamber valve is held in open position.

7. In a device of the character described, a trap chamber of given capacity adapted to fill with liquid, a valve controlling liquid flow into said trap chamber, and a faucet communicating with said trap chamber, said faucet embodying a valve adapted to open and close flow from said chamber through said faucet, and valve operating means between the faucet valve and the trap chamber valve such that said trap chamber valve is closed as said faucet valve is opened, and is opened as said faucet valve is closed, and there being an air inlet passageway adapted to be opened from atmosphere into said trap chamber, said passageway being controlled by said faucet valve so as to be open when the valve is in open position and to be blanked when the valve is moved from open position.

8. Liquid dispensing means for a liquid container which has separate compartments for separate storage of two liquids, comprising a discharge faucet for both of said compartments, said faucet embodying a body having a liquid passage connected with one of the compartments and a trap chamber of a given capacity connected with the other of the compartments, a valve controlling liquid flow into said trap chamber, said faucet embodying a rotatable ported valve plug having a longitudinal discharge passageway and ports communicating therewith adapted to register simultaneously with said trap chamber and said liquid passage respectively, valve operating means controlled by rotation of the valve plug for closing said trap chamber valve as the valve plug is moved toward position of registration of said valve plug ports with said liquid passageway and chamber, and for opening said trap chamber valve as the valve plug is rotated from said position of registration, there being an air inlet passage in the valve body adapted to be opened from atmosphere into said trap chamber, said passageway being controlled by said ported valve plug so as to be open when the plug is in said position of registration of said valve plug ports with said liquid passageway and chamber, and to be blanked when said valve plug is rotated from said position, and another port in said valve plug adapted to register with said trap chamber at a position of the valve plug wherein the trap chamber valve is held in open position and wherein said air inlet passageway is blanked.

9. A valve of the character described, comprising a valve body, a rotatable valve plug in said valve body having a liquid passage therein, a trap chamber in the valve body communicating with said plug and with which said passage is adapted to be registered, a valve adapted to control liquid entrance into said trap chamber, and means controlled by rotation of the valve plug for operating said trap chamber valve to close as the valve plug moves to open position and to open as the valve plug moves to closed position.

10. A valve of the character described, comprising a valve body, a rotatable valve plug in said valve body having a liquid passage therein, a trap chamber in the valve body communicating with said plug and with which said passage is adapted to be registered, a valve adapted to control liquid entrance into said trap chamber, and a cam surface on said valve plug and means operated thereby adapted to cause closure and opening of the trap chamber valve as the valve plug is rotated respectively toward open and closed positions.

11. In a device of the character described, a trap chamber of given capacity adapted to fill with liquid, a valve controlling liquid flow into said trap chamber, and a faucet comprising a body and a faucet valve movable therein and being so arranged that the trap chamber is in communication with a portion of said valve, there being a liquid passage in the faucet body in communication with another portion of the faucet valve, said faucet valve being adapted to be moved to position to open flow from said trap chamber through said faucet and simultaneously to cause continuous flow through the faucet from said liquid passageway, and valve operating means between the faucet valve and the trap chamber valve and operative to close the trap chamber valve in accordance with opening movement of the faucet valve.

12. In a device of the character described, a trap chamber of given capacity adapted to fill with liquid, a valve controlling liquid flow into said trap chamber, and a faucet comprising a body and a ported valve plug rotatable therein and being so arranged that a port of said valve is communicable with said trap chamber, there being a liquid passage in said faucet body with which another port of said valve plug is simultaneously communicable, said valve plug being rotatable to position to open flow from said trap chamber through its first mentioned port to discharge through the faucet and simultaneously to open continuous flow from said liquid passage through its second mentioned port to discharge through the faucet, and valve operating means operated in accordance with rotation of said valve plug toward open position to close the trap chamber valve and with rotation back toward closed position to open the trap chamber valve.

13. Liquid dispensing means for a liquid container which has separate compartments for separate storage of two liquids, comprising a discharge faucet for both of said compartments, said faucet embodying a body having a liquid passage connected with one of the compartments and a trap chamber of a given capacity connected with the other of the compartments, a valve controlling liquid flow into said trap chamber, said faucet embodying a rotatable ported valve plug having a longitudinal discharge passageway and ports communicating therewith adapted to register simultaneously with said trap chamber and said liquid passage respectively, valve operating means controlled by rotation of the valve plug for closing said trap chamber valve as the valve plug is moved toward position of registration of said valve plug ports with said liquid passageway and chamber, and for opening said trap chamber valve as the valve plug is rotated from said position of registration.

14. A valve of the character described, comprising a valve body, a valve plug mounted in said valve body to rotate on a vertical axis, said valve plug having a longitudinal discharge port opening through its lower end, and the valve body being open below said valve plug discharge port, a liquid passage in the valve body communicating with a portion of the valve plug, a trap chamber in the valve body communicating with another portion of said valve plug, said valve plug having ports communicating with its longitudinal discharge passage and adapted to register simultaneously with the liquid passage and trap chamber respectively, a valve adapted to control liquid entrance to said trap chamber, and valve operating means controlled by rotation of the valve plug for closing said trap chamber valve as the valve plug is rotated toward position of registration of said valve plug ports with said liquid passageway and chamber, and for opening said trap chamber valve as the valve plug is rotated from said position of registration.

15. Liquid dispensing means for a liquid container which has separate compartments for separate storage of two liquids, comprising a discharge faucet for both of said compartments, said faucet embodying a body having a liquid passage connected with one of the compartments and a trap chamber of a given capacity connected with the other of the compartments, a valve controlling liquid flow into said trap chamber, said faucet embodying a rotatable ported valve plug having a longitudinal discharge passageway and ports communicating therewith adapted to register simultaneously with said trap chamber and said liquid passage respectively, and a cam surface on said valve plug and means operated thereby adapted to cause closure of the trap chamber valve as the valve plug is moved toward position of registration of said valve plug ports with said liquid passageway and chamber, and to cause opening of said trap chamber valve as the valve plug is rotated from said position of registration.

16. Liquid dispensing means for a liquid container which has separate compartments for separate storage of two liquids, comprising a discharge faucet for both of said compartments, said faucet embodying a body having a liquid passage connected with one of the compartments and a trap chamber of a given capacity connected with the other of the compartments, a valve controlling liquid flow into said trap chamber, a spring acting continuously to close said trap chamber valve, said faucet embodying a rotatable ported valve plug having a longitudinal discharge passageway and ports communicating therewith adapted to register simultaneously with said trap chamber and said liquid passage respectively, and a cam surface on said valve plug and means operated thereby for opening said trap chamber valve against its spring when the valve plug is rotated to a position in which its ports are out of registration with said liquid passageway and chamber, and adapted to allow closure of the trap chamber valve under the influence of its spring when the valve plug is rotated to a position of registration of said ports with said liquid passageway and chamber.

17. A valve of the character described, comprising a valve body, a valve plug mounted in said valve body to rotate on a vertical axis, said valve plug having a longitudinal discharge port opening through its lower end, and the valve body being open below said valve plug discharge port, a liquid passage in the valve body communicating with a portion of the plug, a trap chamber in the valve body communicating with another portion of the valve plug, said valve plug having ports communicating with its longitudinal discharge passage and adapted to register simultaneously with the liquid passage and trap chamber, respectively, a reciprocable valve seating in the valve body controlling liquid entrance into the trap chamber, a spring acting to move said valve to closed position, a cam surface on said valve plug, and a cam follower link between said cam surface and trap chamber valve, said cam surface adapted to cause closure and opening of the trap chamber valve as the valve plug is rotated between positions of registration and non-registration of said valve plug ports with said liquid passageway and trap chamber.

18. A valve of the character described, comprising a valve body, a valve plug mounted in said valve body to rotate on a vertical axis, said valve plug having a longitudinal discharge port opening through its lower end, and the valve body being open below said valve plug discharge port, a liquid passage in the valve body communicating with a portion of the valve plug, a trap chamber in the valve body communicating with another portion of the valve plug, said valve plug having ports communicating with its longitudinal discharge passage and adapted to register simultaneously with the liquid passage and trap chamber, respectively, a reciprocable valve seating in the valve body controlling liquid entrance into the trap chamber, a spring acting to move said valve to closed position, a cam surface on said valve plug, adjacent said trap chamber, and a cam follower link mounted with one end adjacent said cam surface and extending therefrom through the trap chamber to the trap chamber valve, said cam surface and follower link adapted to cause closure and opening of the trap chamber valve as the valve plug is rotated between positions of registration and non-registration of said valve plug ports with said liquid passageway and trap chamber.

19. Liquid dispensing means for a liquid container which has separate compartments for separate storage of two liquids, comprising a discharge faucet for both of said compartments, said faucet embodying a body having a liquid passage connected with one of the compartments and a trap chamber of a given capacity connected with the other of the compartments, a valve controlling liquid flow into said trap chamber, said faucet embodying a rotatable ported valve plug having a longitudinal discharge passageway and ports communicating therewith adapted to register simultaneously with said trap chamber and said liquid passage respectively, and having a third port communicating with the longitudinal passageway which registers with the trap chamber when the valve plug is rotated to such position in the valve body that said first mentioned ports are blanked, valve operating means controlled by rotation of the valve plug for closing the trap chamber valve as the valve plug is rotated toward position of registration of the first mentioned valve plug ports with said liquid passageway and chamber, and for opening said trap chamber valve as the valve plug is rotated from said position of registration, said trap chamber valve being held open by said valve operating means when the valve plug is in position with the third valve plug port registered with the trap chamber.

PAUL G. WAGNER.